United States Patent
Jiang et al.

(10) Patent No.: US 11,947,561 B2
(45) Date of Patent: Apr. 2, 2024

(54) HETEROGENEOUS SCHEMA DISCOVERY FOR UNSTRUCTURED DATA

(71) Applicant: INTERNATIONAL BUSINESS MACHINES CORPORATION, Armonk, NY (US)

(72) Inventors: Peng Hui Jiang, Beijing (CN); Jun Su, Beijing (CN); Sheng Yan Sun, Beijing (CN); Hong Mei Zhang, Beijing (CN); Meng Wan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/807,884

(22) Filed: Jun. 21, 2022

(65) Prior Publication Data

US 2023/0409593 A1    Dec. 21, 2023

(51) Int. Cl.
| | |
|---|---|
| *G06F 16/25* | (2019.01) |
| *G06F 16/21* | (2019.01) |
| *G06F 16/242* | (2019.01) |
| *G06F 16/28* | (2019.01) |

(52) U.S. Cl.
CPC ......... *G06F 16/258* (2019.01); *G06F 16/211* (2019.01); *G06F 16/2433* (2019.01); *G06F 16/254* (2019.01); *G06F 16/284* (2019.01)

(58) Field of Classification Search
CPC .. G06F 16/258; G06F 16/211; G06F 16/2433; G06F 16/254; G06F 16/284
See application file for complete search history.

(56) References Cited

U.S. PATENT DOCUMENTS

| | | | |
|---|---|---|---|
| 7,849,048 B2 | 12/2010 | Langseth | |
| 10,915,379 B1* | 2/2021 | Verma | ................. H04L 67/34 |
| 2007/0011134 A1* | 1/2007 | Langseth | .............. G06F 16/254 |
| 2014/0164318 A1 | 6/2014 | Tsai | |
| 2017/0177625 A1 | 6/2017 | Lam | |
| 2018/0032553 A1 | 2/2018 | Patel | |

(Continued)

OTHER PUBLICATIONS

Oracle® Enterprise Manager Cloud Control Administrator's Guide 13c Release 2 E74458—Oct. 8, 2017 (Year: 2017).*

(Continued)

*Primary Examiner* — Kuen S Lu
(74) *Attorney, Agent, or Firm* — Daniel G. DeLuca

(57) ABSTRACT

An embodiment for analyzing and tracking data flow to determine proper schemas for unstructured data. The embodiment may automatically use a sidecar to collect schema discovery rules during conversion of raw data to unstructured data. The embodiment may automatically generate multiple schemas for different tenants using the collected schema discovery rules. The embodiment may automatically use ETL to export unstructured data to SQL databases with the generated multiple schemas for the different tenants. The embodiment may automatically monitor usage data of the SQL databases and collect the usage data. The embodiment may automatically optimize schema discovery using the collected usage data. The embodiment may automatically discover schemas with hot usage and apply the discovered schemas with hot usage to other tenants for consumption and further monitoring.

20 Claims, 7 Drawing Sheets

(56) References Cited

U.S. PATENT DOCUMENTS

| | | | |
|---|---|---|---|
| 2020/0167323 A1* | 5/2020 | Swamy | G06F 16/256 |
| 2020/0250212 A1* | 8/2020 | Macartney | G06F 16/3328 |
| 2021/0224259 A1 | 7/2021 | Shcherbakov | |
| 2022/0043807 A1 | 2/2022 | Dwivedi | |

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

HETEROGENEOUS SCHEMA DISCOVERY FOR UNSTRUCTURED DATA

BACKGROUND

The present application relates generally to data processing, and more particularly, to analyzing and tracking data flow to determine proper schemas for unstructured data.

The amount of digital data is constantly increasing. The term "Big Data" describes the large volume of data that businesses and other institutions continuously generate. This data can be structured or unstructured. For unstructured data, NoSQL databases are useful for organizing such data, while also providing flexibility for accommodating dynamic schema. The process of Extract Transform Load (ETL) is often used for data integration strategies where data of different types is gathered from multiple sources and consolidated. The ability to analyze, and thus make use of, Big Data, depends on the ability to efficiently search through and characterize large unstructured data sets. A method of discovering the proper schemas for unstructured datasets would be advantageous for businesses seeking to make use of Big Data including large volumes of unstructured and structured data.

SUMMARY

According to one embodiment, a method, computer system, and computer program product for analyzing and tracking data flow to determine proper schemas for unstructured data is provided. The embodiment may include automatically using a sidecar to collect schema discovery rules during conversion of raw data to unstructured data, the schema discovery rules including conversion rules and conditions. The embodiment may also include automatically generating multiple schemas for different tenants using the collected schema discovery rules. The embodiment may also include automatically using extract transform load (ETL) to export unstructured data to structured query language (SQL) databases with the generated multiple schemas for the different tenants. The embodiment may further include automatically monitoring usage data of the SQL databases and collecting the usage data. The embodiment may also include automatically optimizing schema discovery using the collected usage data. The embodiment may also include automatically determining schemas with hot usage and applying the discovered schemas with hot usage to other tenants.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
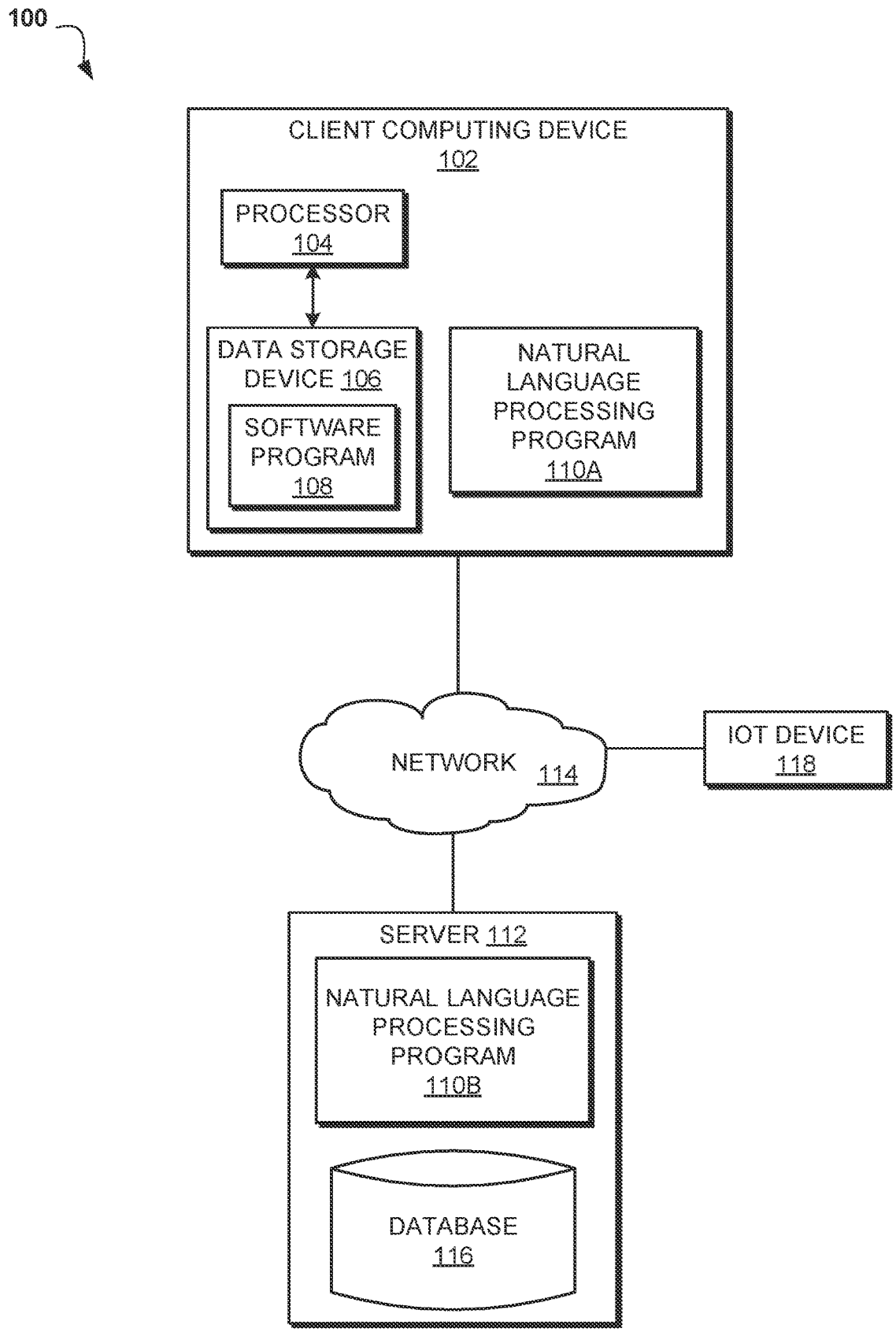
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to data processing, and more particularly, to analyzing and tracking data flow to determine proper schemas for unstructured data. The following described exemplary embodiments provide a system, method, and program product to, among other things, automatically use a sidecar to collect schema discovery rules during conversion of raw data to unstructured data, automatically generate multiple schemas for different tenants using the collected schema discovery rules, automatically use ETL to export unstructured data to SQL databases with the generated multiple schemas for the different tenants, and automatically monitor usage data of the SQL databases and collect the usage data to optimize schema discovery and discover schemas with hot usage to apply the discovered schemas with hot usage to other tenants for consumption and further monitoring. Therefore, the present embodiment has the capacity to improve proper schema discovery for unstructured datasets by comprehensively analyzing and tracking data flow to continuously optimize schema discovery, especially in environments having multiple tenants and large volumes of unstructured data.

As previously described, the amount of digital data is constantly increasing. The term "Big Data" describes the large volume of data that businesses and other institutions continuously generate. This data can be structured or unstructured. For unstructured data, NoSQL databases are useful for organizing such data, while also providing flexibility for accommodating dynamic schema. The process of ETL (Extract Transform Load) is often used for data integration strategies where data of different types is gathered from multiple sources and consolidated. The ability to analyze, and thus make use of, Big Data, depends on the ability to efficiently search through and characterize large unstructured data sets.

The diversity of unstructured data creates challenges for using ETL to convert data from OLTP (online transactional processing) to OLAP (online analytical processing). For example, discovering the proper schema for unstructured data is a particularly difficult task when the schemas are derived from heterogeneous datasets. Proper schema is difficult at least because there are many different types of NoSQL databases, a lot of unstructured data originates from different sources, the unstructured data may be from multiple different tenants, and the consumption purpose in OLAP may vary. Accordingly, a method of discovering the proper schemas for unstructured datasets, especially in environments having large volumes of data and multiple tenants, would be advantageous for businesses seeking to make use of Big Data.

According to at least one embodiment of a computer system capable of employing methods in accordance with the present invention to analyze and track data flow to determine proper schemas for unstructured data, the method, system, computer program product may automatically use a sidecar to collect schema discovery rules during conversion of raw data to unstructured data, the schema discovery rules including conversion rules and conditions. The method, system, computer program product may automatically generate multiple schemas for different tenants using the collected schema discovery rules. Next, the method, system, computer program product may automatically use ETL to export unstructured data to SQL databases with the generated multiple schemas for the different tenants. According to one embodiment, the method, system, computer program product may then automatically monitor usage data of the SQL databases and collect the usage data. The method, system, computer program product may then automatically optimize schema discovery using the collected usage data. The method, system, computer program product may then automatically discover schemas with hot usage and apply the discovered schemas with hot usage to other tenants for consumption and further monitoring. In turn, the method, system, computer program product has provided improved proper schema discovery for unstructured datasets by comprehensively analyzing and tracking data flow to continuously optimize schema discovery, especially for environments having multiple tenants and large volumes of unstructured data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for analyzing and tracking data flow to determine proper schemas for unstructured data.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a data processing program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a data processing program 110B and a database 116 and communicating with the client computing device 102 and IoT Device 118 via the communication network 114, in accordance with embodiments of the present disclosure. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the data processing program 110A, 110B may be a program capable of automatically using a sidecar to collect schema discovery rules during conversion of raw data to unstructured data, the schema discovery rules including conversion rules and conditions. Data processing program 110A, 110B may then automatically generate multiple schemas for different tenants using the collected schema discovery rules. Next, data processing program 110A, 110B may automatically use ETL to export unstructured data to SQL databases with the generated multiple schemas for the different tenants. Data processing program 110A, 110B may then automatically monitor usage data of the SQL databases and collect the usage data. Then, data processing program 110A, 110B may automatically optimize schema discovery using the collected usage data. Finally, data processing program 110A, 110B may automatically discover schemas with hot usage and apply the discovered schemas with hot usage to other tenants. In turn, data processing program 110A, 110B ha has provided improved proper schema discovery for unstructured datasets by comprehensively analyzing and tracking data flow to continuously optimize schema discovery, especially for environments having multiple tenants and large volumes of unstructured data.

Figure 2A:
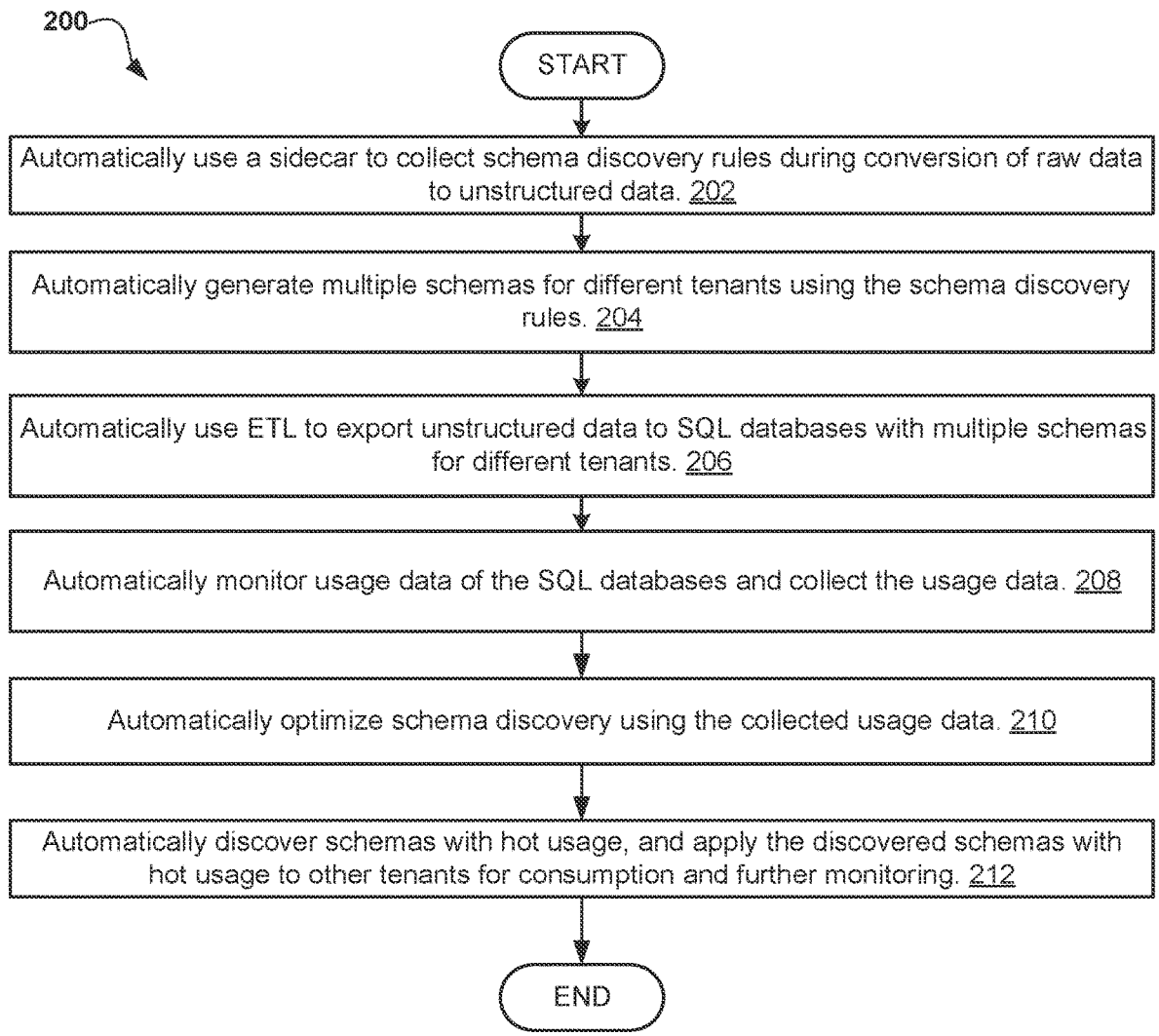
FIG. 2A illustrates an operational flowchart for analyzing and tracking data flow to determine proper schemas for unstructured data according to at least one embodiment.

Referring now to FIG. 2A, an operational flowchart depicting a process 200 for analyzing and tracking data flow to determine proper schemas for unstructured data according to at least one embodiment is provided. At 202, data processing program 110A, 110B automatically uses a sidecar to collect schema discovery rules during conversion of raw data to unstructured data. The schema discovery rules may include conversion rules as well as condition rules. In the context of this disclosure, a sidecar is a separate container that runs alongside a main application container, the sidecar being responsible for various auxiliary functions or processes that are run in parallel with the main application container. Data processing program 110A,110B may use a sidecar to collect schema discovery rules including conversion rules and condition rules during various steps of the conversion of raw data to unstructured data. For example, data processing program 110A,110B may utilize the sidecar to collect schema discovery rules during cleansing (a process used for resolving inconsistencies and missing values in the raw data), standardization (a process used to apply formatting rules to a given dataset), deduplication (the process of removing or excluding redundant data), verification (the process of removing unusable data and flagging anomalies), sorting (the process of organizing the data according to a type), or any other performed tasks during conversion of raw data to unstructured data. In one example, data processing program 110A,110B may receive data including the Gross Domestic Product (GDP) of the United States over time measured in United States dollars for currency, the GDP of China over time measured in Yuan for currency, and data for foreign exchange rates over time. Data processing program 110A,110B may use the sidecar to collect schema discovery rules including conversion rules and condition rules and then use the collected schema discovery rules to integrate and convert the received raw data into unstructured data. For example, upon converting and integrating the above-described data, data processing program 110A,110B may generate data depicting the GDP of the United States and China overtime from the first two pieces of received raw data on a single graph that is adjusted by the exchange rate from the final piece of processed raw data. In an exemplary embodiment, the raw data that has been converted to unstructured data may be stored in a NoSQL database. In the context of this disclosure, a NoSQL database is a database that stores data in any form other than relation tables.

Figure 2B:
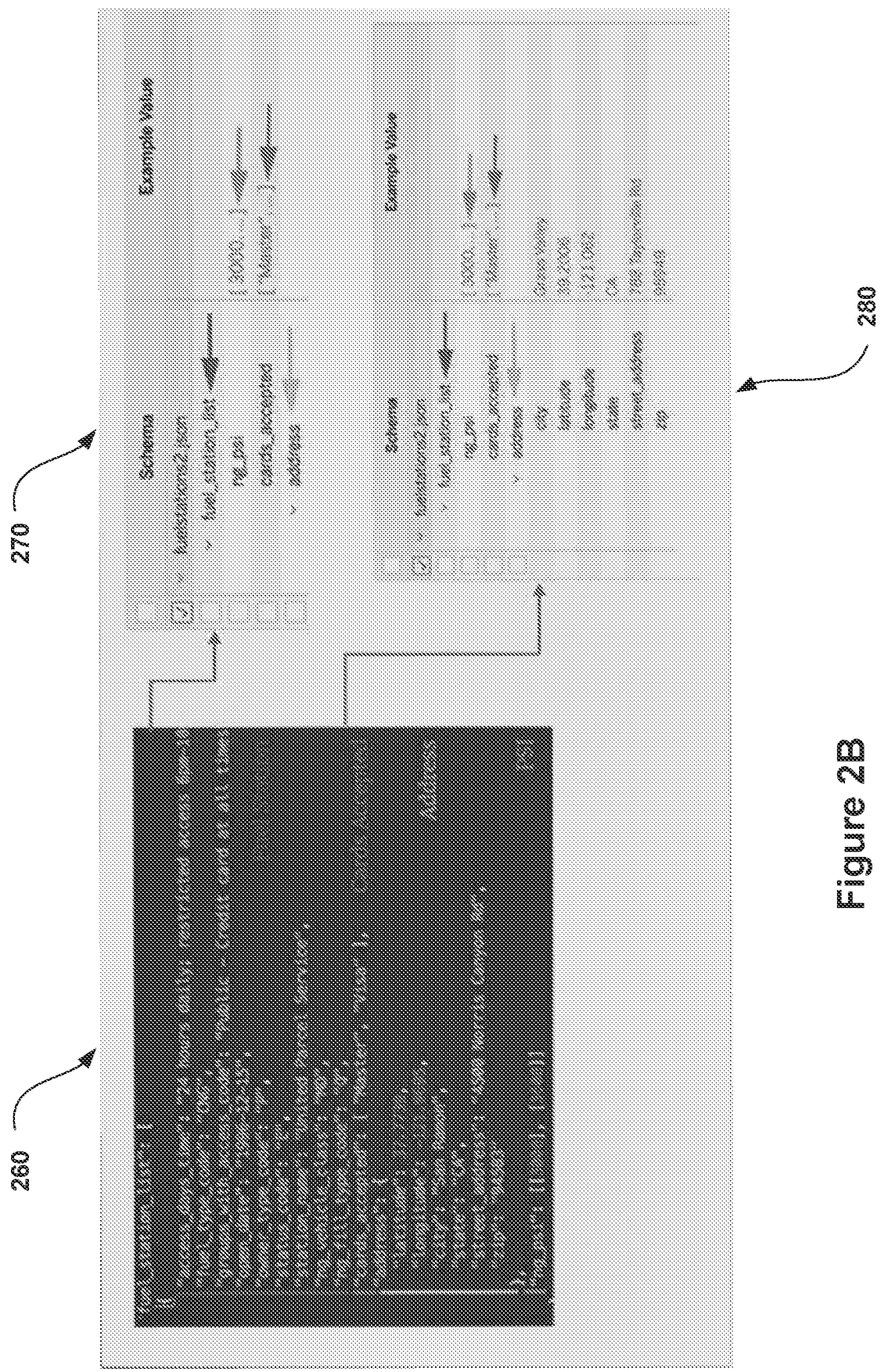
FIG. 2B illustrates an example of schema generation performed by an illustrative system for discovering proper schemas for unstructured data according to at least one embodiment.

At 204, data processing program 110A,110B automatically generates multiple schemas for different tenants using the schema discovery rules. An example of data processing program 110A,110B performing schema generation is shown in FIG. 2B. In FIG. 2B, data processing program 110A,110B is using dataset 260 to generate a first schema 270, and a second schema 280. As shown in FIG. 2B, in instances where NoSQL data being processed has a threshold number of columns above a threshold number, data processing program 110A,110B may use fat tables, that is tables with many columns, to represent and process documents and data contained therein. The threshold number may be set to any desired number. Otherwise, for multiple fields which can be combined, data processing program 110A,110B will merge the fields together into one column. For single fields containing multiple dimensions, data processing program 110A,110B may split the single field into multiple virtual fields.

Next, at 206, data processing program 110A,110B uses ETL (Extract, Transform Load) to export NoSQL data to SQL databases with multiple schemas for different tenants. ETL'd data is referred to as "Extracted, Transformed, and Loaded" because such data is extracted from an external site, transformed into an appropriate data storage type, and loaded on a local data processing system. However, ETL'd data could also be data that is generated on-site and then stored on-site. Frequently, ETL'd data is accessed directly, such as on a hard drive, though ETL'd data could take the form of a tape storage library, a hard disk drive form, or many other forms. Advantages of storing data as ETL'd data include lower networking and hardware resources relative to federated data, as well as more rapid query response time relative to federated data.

At 208, data processing program 110A,110B monitors usage data of the SQL databases and collects the usage data. For example, data processing program 110A,110B may record hit data in the SQL databases and use the recorded hit data for schema discovery to generate new schemas and export additional data to the SQL databases. In the context of this disclosure, hit data may be any instance of user interaction with data that may be recorded or used with an analytical tool. Data processing program 110A,110B may also track the generated views, queries, and other usage of a given SQL database to identify further candidate schemas for further schema discovery. Data processing program 110A,110B may utilize or include any known tools for monitoring usages of databases and tables therein.

At 210, data processing program 110A,110B may use the usage data collected at 208 to automatically optimize schema discovery. Data processing program 110A,110B may continuously optimize the process of discovering the proper schema by using the collected usage data, including tenant-specific information to improve schema discovery in environments having large volumes of data and multiple tenants. Data processing program 110A,110B may collect data to continuously optimize schema discovery through machine learning strategies, thereby providing for improved proper schema discovery for unstructured datasets by comprehensively analyzing and tracking data flow to continuously optimize schema discovery, especially for environments having multiple tenants and large volumes of unstructured data.

In the context of this disclosure, machine learning broadly describes a function of a system that learns from data. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

At 212, data processing program 110A,110B may automatically discover schemas with hot usage (high frequency of usage) and apply the discovered schemas with hot usage to other tenants for consumption and further monitoring. For example, data processing program 110A,110B may discover a schema "X" with hot usage and send the usage data to a schema discovery processor. Data processing program 110A,110B may then generate schema discovery results associated with a first tenant. Data processing program 110A,110B may then apply the discovered schema to another second tenant and use ETL along with the newly discovered schema to generate SQL data for the other second tenant. Data processing program 110A,110B can then monitor the usage of the new SQL data and continuously repeat the above-described process to optimize further schema discovery.

While the steps of process 200 were described and presented above chronologically, data processing program 110A,110B may process and analyze data at various junctures (using certain steps described above) within a given data flow to optimize proper schema discovery. The ability of data processing program 110A,110B to engage with various steps of a given dataflow will be better understood in view of the discussion below in connection with FIG. 3.

Figure 3:
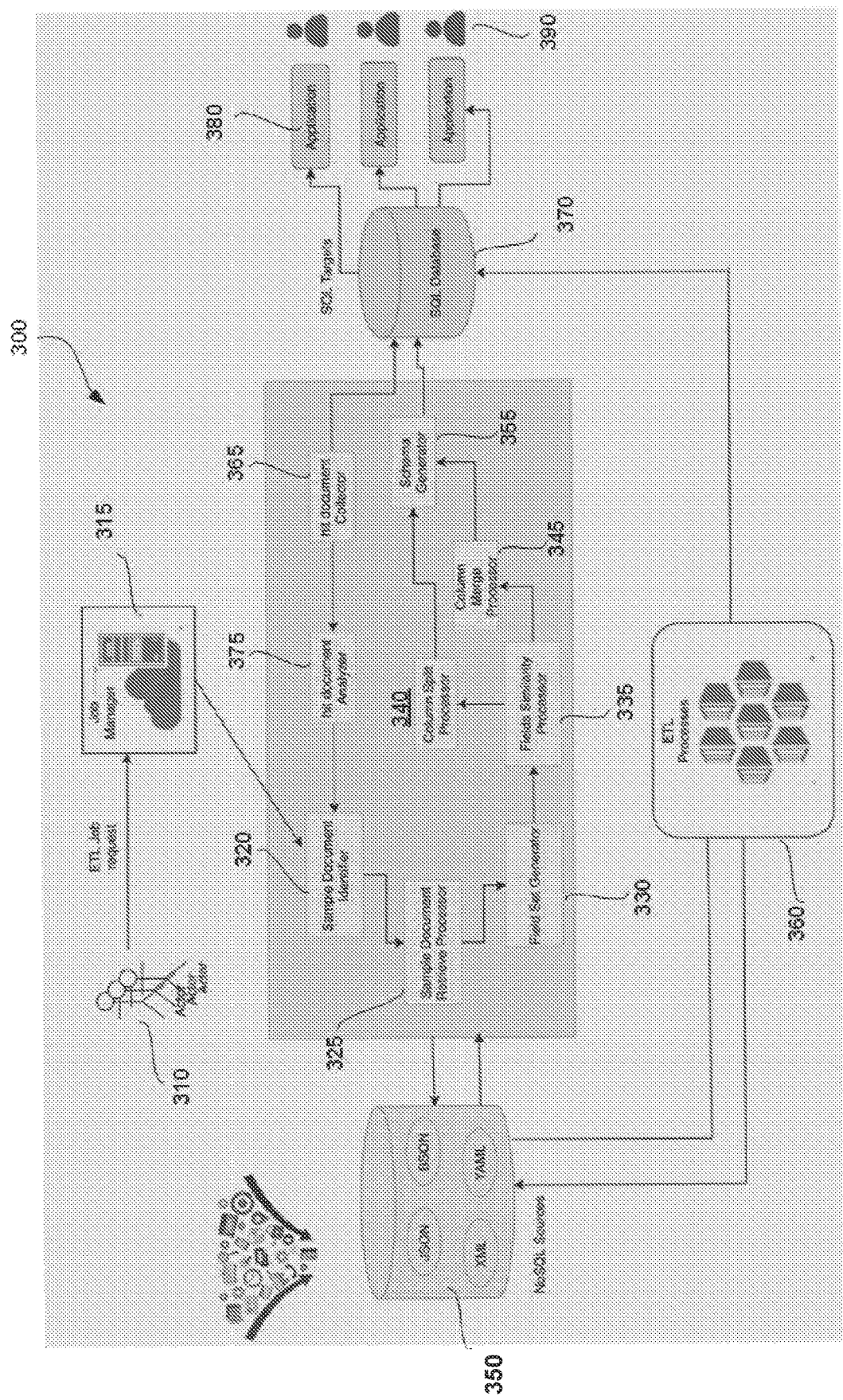
FIG. 3 depicts an exemplary system for analyzing and tracking data flow to determine proper schemas for unstructured data according to at least one embodiment.

FIG. 3 depicts an exemplary system 300 for analyzing and tracking data flow to determine proper schemas for unstructured data according to at least one embodiment. In exemplary system 300, one or more actors 310 may send an ETL job request to a job manager 315. Sample document identifier 320 may then identify unique document identifiers (document ID) or strings associated with relevant documents. Sample document retrieve processor 325 may then produce a relevance-ranked list of documents based on the request made by actors 310. The data may then be converted to unstructured data 350 in a desired format, for example, JavaScript Object Notation (JSON), Binary Javascript Object Notation (BSON), Extensible Markup Language (XML), data serialization languages such as 'yet another markup language' (YAML), or any other suitable format for unstructured data. ETL processors 360 may then convert unstructured data 350 to structured data for inclusion within SQL databases 370, which may be deployed via applications 380 to various tenants 390.

However, data within exemplary system 300 is also further processed and characterized throughout the flow of the data. For example, after sample document retrieve processor 325 has produced a ranked list of documents based on the request made by actors 310, the data may be passed through a field set generator 330. Field set generator 330 may be a generator operator that functions to define the field layout of a given dataset. A fields similarity processor 335 may then be used to determine similarities between fields in various datasets or documents. A column split processors 340 and column merge processors 345 may then be used analyze the data in preparation for using a schema generator 355 to generate multiple schemas in accordance with step 204 described above in connection with FIG. 2A. As discussed above, in instances where NoSQL data being processed has a threshold number of columns above a threshold, exemplary system 300 may use fat tables to represent and process documents or data therein. Otherwise, for multiple fields which can be combined, exemplary system 300 will use column merge processor 345 to merge the fields together into one column. For single fields containing multiple dimensions, exemplary system 300 may use column split processor 340 to split the single field into multiple virtual fields. Exemplary system 300 may further include a hit document collector 365 that monitors and collects usage data (hit data) for datasets and documents being processed. The collected usage data may then be analyzed by a hit document analyzer 375 for further processing.

Exemplary system 300 may continuously process and analyze datasets at various steps in the data flow. For example, while the process described above may start with raw data, exemplary system 300 is also capable of processing and analyzing converted NoSQL data or SQL data that is already being used by various tenants and applications. As described above, this allows exemplary system 300 to use collected data, including tenant usage data, to continuously optimize schema discovery through machine learning as exemplary system 300 collects and processes more data. In other words, the data flow shown in FIG. 3 is multi-directional, and does not simply move left-to-right as illustrated, but rather can go in any direction in which datasets of any type or format may be processed and analyzed by the tools and structures that make up the data processing program contained within exemplary system 300 and described above in connection with FIG. 2A.

It may be appreciated that FIGS. 2A, 2B, and 3 provide only illustrations of an exemplary implementation and do not imply any limitations with regard to how different embodiments may be implemented. Many modifications to the depicted environments may be made based on design and implementation requirements.

Figure 4:
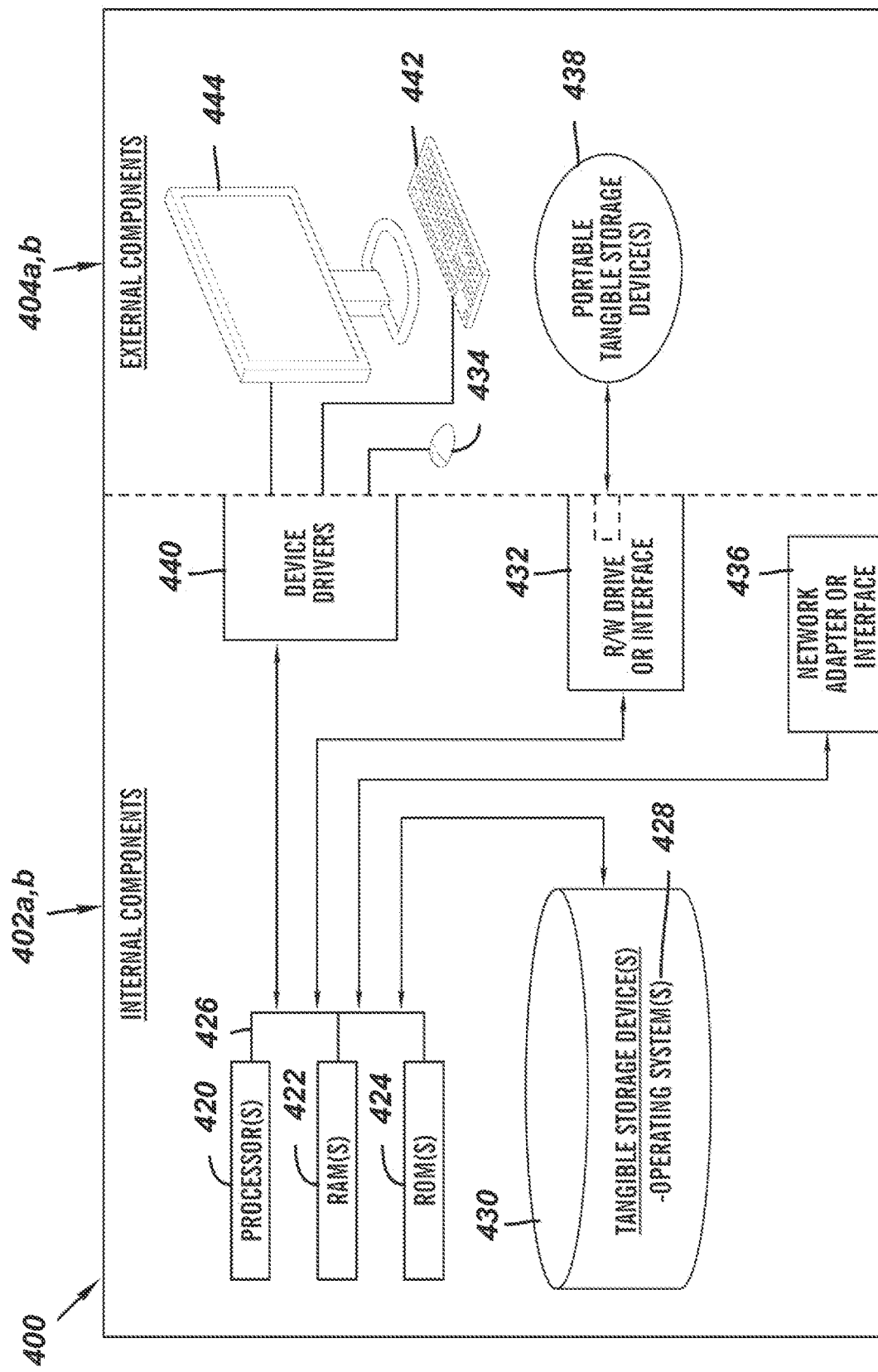
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the data processing program 110A in the client computing device 102 and the data processing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the data processing program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the data processing program 110A in the client computing device 102 and the data processing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the data processing program 110A in the client computing device 102 and the data processing program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
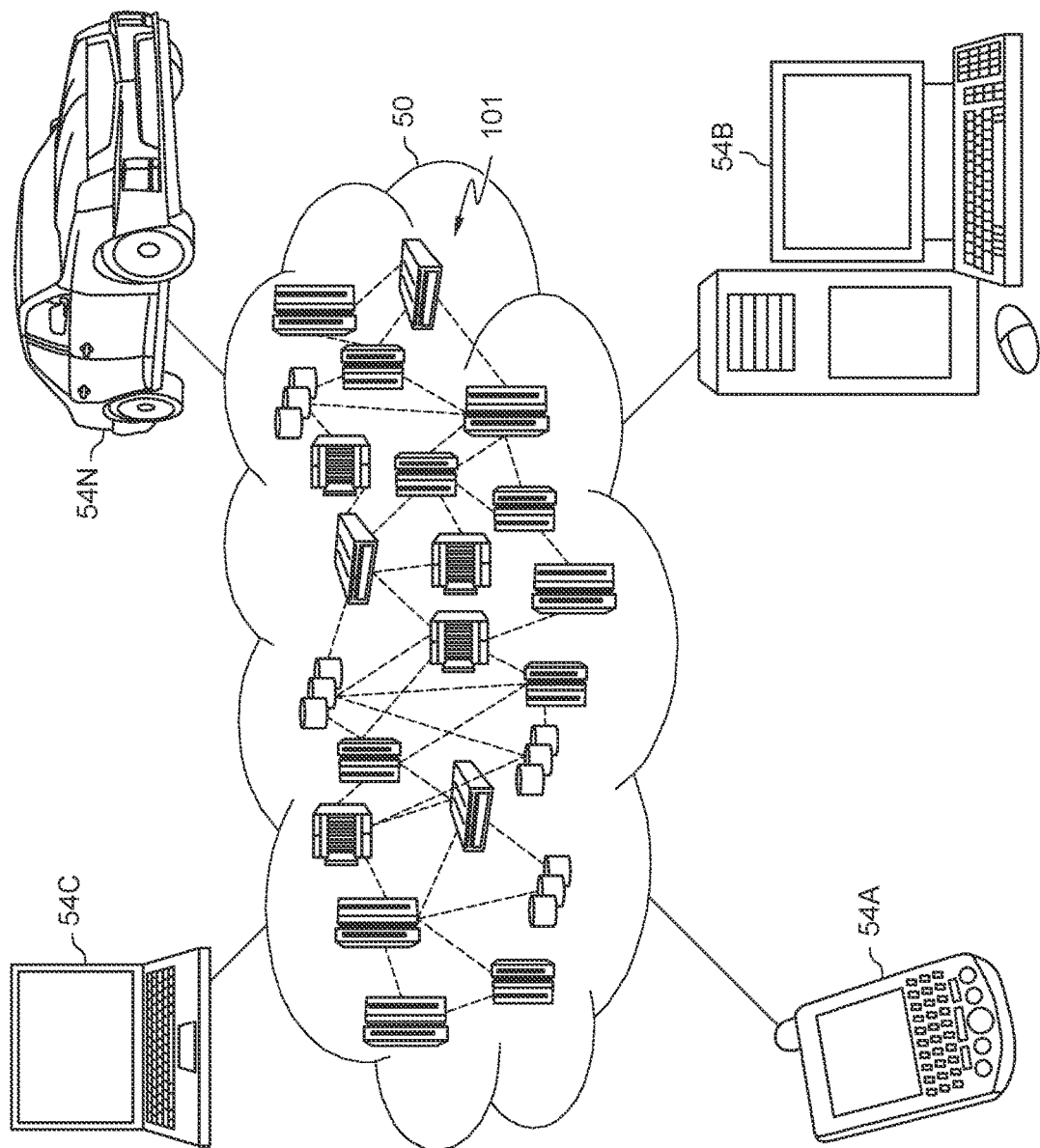
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
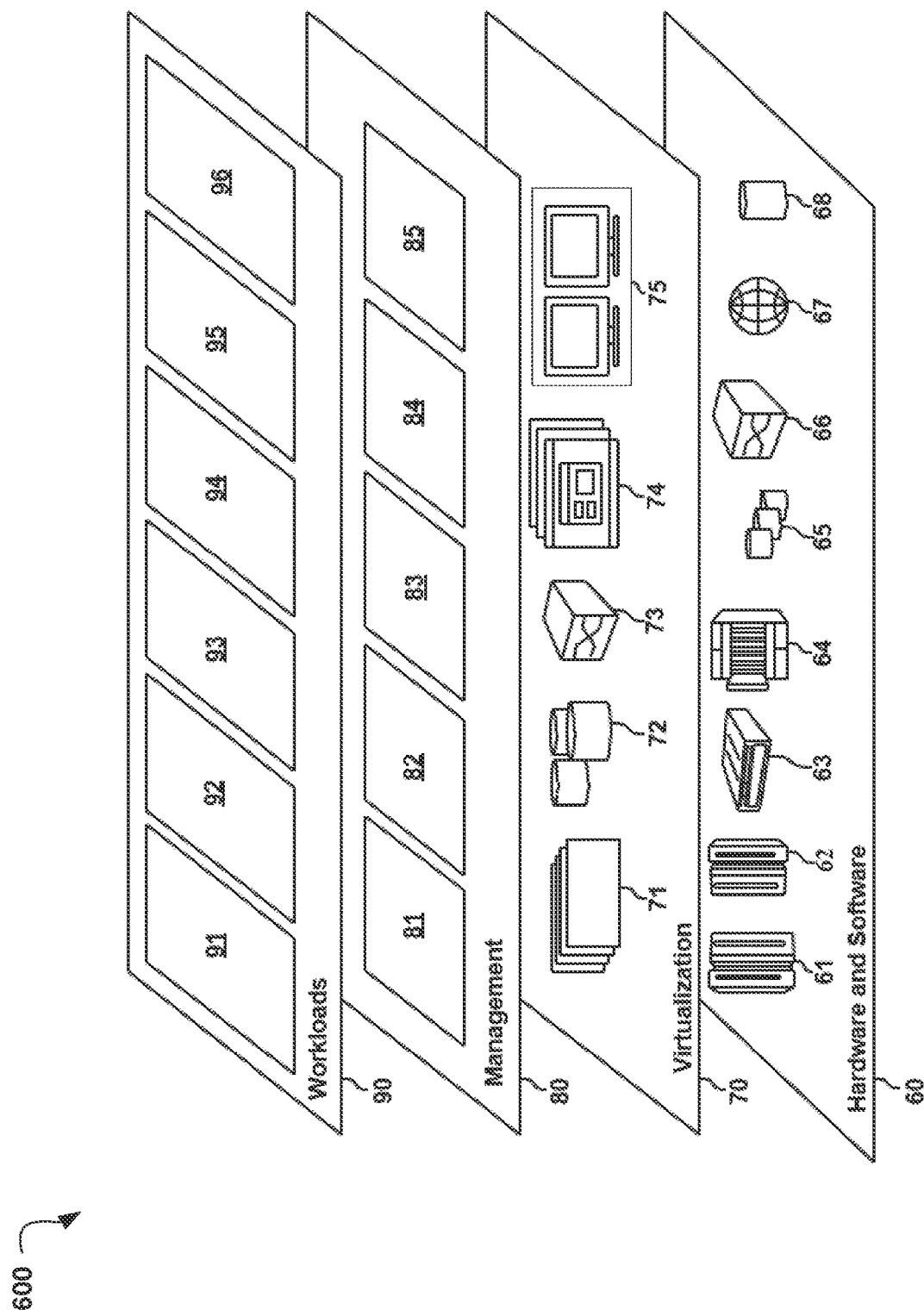
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; data processing 96. Data processing 96 may relate to analyzing and tracking data flow to determine proper schemas for unstructured data.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of analyzing and tracking data flow to determine proper schemas for unstructured data, the method comprising:
    automatically using a sidecar to collect schema discovery rules during conversion of raw data to the unstructured data, the schema discovery rules including conversion rules and conditions;
    automatically generating a plurality of schemas for different tenants using the collected schema discovery rules;
    automatically using extract transform load (ETL) to export the unstructured data to structured query language (SQL) databases with the generated plurality of schemas for the different tenants;
    automatically monitoring usage data of the SQL databases and collecting the usage data; and
    automatically optimizing schema discovery based on the collected usage data by identifying schemas with hot usage, and applying the identified schemas with hot usage to other tenants for further consumption and monitoring.

2. The computer-based method of claim 1, wherein automatically generating the plurality of schemas for the different tenants using the collected schema discovery rules further comprises:
    in response to detecting non-structured query language NoSQL data having a threshold number of columns, using fat tables to represent or process the NoSQL data.

3. The computer-based method of claim 1, wherein automatically generating the plurality of schemas for the different tenants using the collected schema discovery rules further comprises:
in response to detecting a plurality of fields, merging the multiple fields together into a single column.

4. The computer-based method of claim 1, wherein automatically generating the plurality of schemas for the different tenants using the collected schema discovery rules further comprises:
in response to detecting a single field containing a plurality of dimensions, splitting the single field containing the plurality of dimensions into a plurality of virtual fields.

5. The computer-based method of claim 1, wherein automatically monitoring the usage data of the SQL databases and collecting the usage data further comprises:
collecting hit data for the SQL databases and storing the hit data for the schema discovery and new schema generation.

6. The computer-based method of claim 1, wherein automatically optimizing the schema discovery using the collected usage data is performed in conjunction with a machine learning model.

7. The computer-based method of claim 1, wherein the unstructured data includes data in one of JavaScript Object Notation (JSON), Binary Javascript Object Notation (BSON), Extensible Markup Language (XML), or yet another markup language (YAML) format.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
automatically using a sidecar to collect schema discovery rules during conversion of raw data to the unstructured data, the schema discovery rules including conversion rules and conditions;
automatically generating a plurality of schemas for different tenants using the collected schema discovery rules;
automatically using extract transform load (ETL) to export the unstructured data to structured query language (SQL) databases with the generated plurality of schemas for the different tenants;
automatically monitoring usage data of the SQL databases and collecting the usage data; and
automatically optimizing schema discovery based on the collected usage data by identifying schemas with hot usage, and applying the identified schemas with hot usage to other tenants for further consumption and monitoring.

9. The computer system of claim 8, wherein automatically generating the plurality of schemas for the different tenants using the collected schema discovery rules further comprises:
in response to detecting non-structured query language NoSQL data having a threshold number of columns, using fat tables to represent or process the NoSQL data.

10. The computer system of claim 9, wherein automatically generating the plurality of schemas for the different tenants using the collected schema discovery rules further comprises:
in response to detecting a plurality of fields, merging the multiple fields together into a single column.

11. The computer system of claim 9, wherein automatically generating the plurality of schemas for the different tenants using the collected schema discovery rules further comprises:
in response to detecting a single field containing a plurality of dimensions, splitting the single field containing the plurality of dimensions into a plurality of virtual fields.

12. The computer system of claim 9, wherein automatically monitoring the usage data of the SQL databases and collecting the usage data further comprises:
collecting hit data for the SQL databases and storing the hit data for the schema discovery and new schema generation.

13. The computer system of claim 9, wherein automatically optimizing the schema discovery using the collected usage data is performed in conjunction with a machine learning model.

14. The computer system of claim 9, wherein the unstructured data includes data in one of JavaScript Object Notation (JSON), Binary Javascript Object Notation (BSON), Extensible Markup Language (XML), or yet another markup language (YAML) format.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
automatically using a sidecar to collect schema discovery rules during conversion of raw data to the unstructured data, the schema discovery rules including conversion rules and conditions;
automatically generating a plurality of schemas for different tenants using the collected schema discovery rules;
automatically using extract transform load (ETL) to export the unstructured data to structured query language (SQL) databases with the generated plurality of schemas for the different tenants;
automatically monitoring usage data of the SQL databases and collecting the usage data; and
automatically optimizing schema discovery based on the collected usage data by identifying schemas with hot usage, and applying the identified schemas with hot usage to other tenants for further consumption and monitoring.

16. The computer program product of claim 15, wherein automatically generating the plurality of schemas for the different tenants using the collected schema discovery rules further comprises:
in response to detecting non-structured query language NoSQL data having a threshold number of columns, using fat tables to represent or process the NoSQL data.

17. The computer program product of claim 16, wherein automatically generating the plurality of schemas for the different tenants using the collected schema discovery rules further comprises:
in response to detecting a plurality of fields, merging the multiple fields together into a single column.

18. The computer program product of claim 16, wherein automatically monitoring the usage data of the SQL databases and collecting the usage data further comprises:

collecting hit data for the SQL databases and storing the hit data for the schema discovery and new schema generation.

19. The computer program product of claim 16, wherein automatically optimizing the schema discovery using the collected usage data is performed in conjunction with a machine learning model.

20. The computer program product of claim 16, wherein the unstructured data includes data in one of JavaScript Object Notation (JSON), Binary Javascript Object Notation (BSON), Extensible Markup Language (XML), or yet another markup language (YAML) format.

\* \* \* \* \*